United States Patent Office
3,116,305
Patented Dec. 31, 1963

3,116,305
HYDROXYBENZYL ESTERS
Rupert C. Morris, Berkeley, Albert L. Rocklin, Walnut Creek, and Karl J. Sax, Orinda, Calif., assignors to Shell Oil Company, New York, N.Y., a corporation of Delaware
No Drawing. Filed Feb. 18, 1960, Ser. No. 9,437
8 Claims. (Cl. 260—410.5)

This invention relates to novel esters of organic acids. More particularly, it relates to esters of novel dialkyl hydroxybenzyl alcohols and of organic acids and to stabilized compositions containing such esters.

It has been found that 3,5-dialkyl hydroxybenzyl alcohols, particularly the 3,5-dialkyl-4-hydroxybenzyl alcohols wherein at least one of the alkyl radicals is branched on the alpha carbon atom, are useful antioxidants for such organic materials normally subject to oxidative deterioration as natural and synthetic rubber, polymers, gasoline, and the like. These benzyl alcohols are, however, relatively polar and therefor of somewhat limited miscibility in non-polar organic substrates.

It has now been found that by reacting these 3,5-dialkyl-4-hydroxybenzyl alcohols with organic carboxylic acids novel esters which preserve the desirable antioxidant features of the alkylated hydroxybenzyl alcohols but which have enhanced miscibility in organic substrates are formed.

It is therefore an object of this invention to provide a new class of antioxidants. Another object of the invention is the provision of a new class of esters characterized by superior antioxidant properties and enhanced miscibility with non-polar materials. Another object is the provision of a class of polymerizable esters having antioxidant characteristics. Still another object is a novel class of esters having superior sun-screening characteristics. The provision of stabilized compositions comprising organic materials normally subject to oxidative deterioration containing a stabilizing amount of such esters is yet another object. Other objects will be apparent from the following description of the invention.

These objects are accomplished in the following invention by stabilized compositions comprising an organic material subject to oxidative deterioration, having in intimate contact therewith an amount of a 3,5-dialkyl-4-hydroxybenzyl eser of an organic carboxylic acid sufficient to stabilize the material against oxidation. Such esters can be described by the general formula

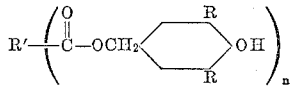

where R is an alkyl radical, preferably having up to 8 carbon atoms and one of the alkyl radicals on each benzyl nucleus is branched on the alpha carbon atom, R' is an n-valent organic radical, and n is a positive integer from 1 to 4.

These esters can best be understood by consideration of the manner in which they are prepared. Most conveniently, they may be prepared from the 3,5-dialkyl-4-hydroxybenzyl alcohol by reaction with an acid or acid derivative, such as an acid anhydride. Such alcohols are those having an alkyl radical on each of the carbon atoms in the 3 and 5 ring positions relative to the hydroxymethyl group, at least one of the alkyl radicals being branched on the alpha carbon atom, and a hydroxyl group on one of the remaining ring carbon atoms. It will be seen from this description that the starting hydroxybenzyl alcohols are 3,5-dialkyl-4-hydroxybenzyl alcohols. Exemplary alcohols are 3-isopropyl-5-methyl-4-hydroxybenzyl alcohol; 3-tert-butyl-5-ethyl-4-hydroxybenzyl alcohol; 3-tert-octyl-5-hexyl-4-hydroxybenzyl alcohol; 3-cyclohexyl-5-octyl-4-hydroxybenzyl alcohol, and the like. Most preferred starting benzyl alcohols are those having both alkyl groups branched on the alpha carbon atom. Such alcohols are represented by 3-tert-butyl-5-isopropyl-4-hydroxybenzyl alcohol; 3,5-diisopropyl-4-hydroxybenzyl alcohol; 3,5-di-tert-butyl-4-hydroxybenzyl alcohol; 3,5-di-sec-butyl-4-hydroxybenzyl alcohol; 3,5-dicyclohexyl-4-hydroxybenzyl alcohol; 3,5-di-tert-amyl-4-hydroxybenzyl alcohol; and 3,5-di-sec-octyl-4-hydroxybenzyl alcohol. These alcohols, wherein the phenolic hydroxyl group is afforded the most steric hindrance by the adjacent branched alkyl substituents, make esters having the best antioxidant properties.

The novel esters of the invention are prepared by reacting a 3,5-dialkyl-4-hydroxybenzyl alcohol of the type described with an organic carboxylic acid or such an acid derivative as an acid anhydride or acid chloride. Naturally, the type of ester desired will determine which acid or acid derivative is selected as a reactant.

The resulting esters are those wherein each ester moiety is that of 3,5-dialkyl-4-hydroxybenzyl alcohol and the acid moiety is that of an organic carboxylic acid selected from the group consisting of alkenoic acids, aliphatic hydrocarbon dicarboxylic acids, fatty acids and aromatic acids having up to two nuclei. By ester moiety is meant the 3,5-dialkyl-4-hydroxybenzyl radical.

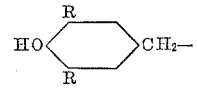

while by acid moiety is meant the radical resulting from the removal of the hydrogen atom from each carboxyl group

of an organic carboxylic acid of the group noted. In the ester moiety referred to, the preferred alkyl radicals are those having up to eight carbon atoms, wherein at least one of which on each benzyl nucleus is branched on the alpha carbon atom. Because these esters contain at least one hindered phenolic hydroxyl group, it has been found that they are surprisingly useful in stabilized compositions comprising an organic material subject to oxidative deterioration which have a stabilizing amount of the ester.

For example, the 3,5-dialkyl-hydroxybenzyl esters of monocarboxylic alkanoic acids are readily prepared by reacting together the monocarboxylic alkanoic acid whose ester is desired and the hydroxybenzyl alcohol. Typical acids include acetic acid, butyric acid, caprylic acid, undecanoic acid, and the like. The resulting esters have the general structure

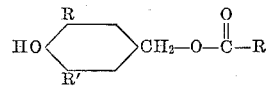

where R is alkyl and R' is alkyl and branched on the alpha carbon atom. Such esters are represented by 3,5-diisopropyl-4-hydroxybenzyl propionate; 3,5-di-tert-butyl-4-hydroxybenzyl acetate; 3-methyl-5-tert-amyl-4-hydroxybenzyl isobutyrate; 3-ethyl-5-isopropyl-4-hydroxybenzyl pivalate; and 3,5-di-tert-octyl-4-hydroxybenzyl dodecylate.

Of particular interest as reactants because they afford esters having a hydrophobic ester moiety are the fatty acids, both saturated and unsaturated. These acids include those monocarboxylic acids having up to three unsaturated linkages, either olefinic or acetylenic, and up to 26 carbon atoms. Examples of such saturated fatty acids include lauric, myristic, palmitic, stearic, arachidic, lignoceric and cerotic. Typical unsaturated olefinic fatty acids are palmitoleic, oleic, ricinoleic, linoleic, linolenic, arachidonic and erucic acids; while acetylenic fatty acids include tariric acid. These acids may be used in their separated form, or they may be employed as mixtures, e.g., tall oil fatty acids and other natural or synthetic acid mixtures. Such polymers of fatty acids as the dimers and trimers thereof may also be employed; the acids are of the type described by Bradley et al., I. and E. C. 33, 86–89 (1941). The esters of these acids, such as 3,5-di-tert-butyl-4-hydroxybenzyl palmitate; 3,5-diisopropyl-4-hydroxybenzyl linolenate; 3-methyl-5-tert-butyl-4-hydroxybenzyl stearate and 3-hexyl-5-tert-amyl-4-hydroxybenzyl oleate, are particularly soluble in such hydrocarbon substrates as gasoline, fuel and lubricating oil, and grease, so the solutions of these esters in such substrates are extremely stable.

By employing shorter chain alkenoic acids for esterifying the noted hydroxybenzyl alcohols, novel polymerizable esters may be obtained. For example, acids, such as acrylic, methacrylic, vinylacetic and allylacetic acid, when reacted with 3,5-dialkyl-hydroxybenzyl alcohols, afford esters having an ester moiety containing a hindered phenolic hydroxyl and an acid moiety containing an olefinic double bond. Representative esters include 3,5-di-tert-butyl-4-hydroxybenzyl acrylate; 3,5-diisopropyl-2-hydroxybenzyl methacrylate; 3-tert-butyl-5-isopropyl-4-hydroxybenzyl crotonate; 3-methyl-5-tert-butyl-4-hydroxybenzyl ethacrylate, and the like. Of these esters, those of alpha,beta-unsaturated alkenoic acids having up to 8 carbon atoms are preferred, since they are the most polymerizable.

An important use of these polymerizable esters is their copolymerization with olefinic monomers to afford organic plastics having antioxidant functions as portions of their constituent macromolecules. It is known that such polymers as polystyrene and polymethyl methacrylate are susceptible to oxidative deterioration. When such materials as styrene, the acrylates or the methacrylates are copolymerized with the polymerizable esters of this invention, however, the resulting polymer is characterized by far greater resistance to oxidation than either the polymer without the esters or the polymeric material which contains an antioxidant which has been mechanically added thereto.

The novel esters of this invention include those of the 3,5-dialkyl-hydroxybenzyl alcohols described and aromatic acids. Not only are esters of this class characterized by superior antioxidant properties, but they also possess useful properties as ultraviolet absorbing agents. They are therefore doubly useful as stabilizers for such polymeric materials as polyethylene, polypropylene and polystyrene which are subject to degradation by both oxygen and light. Typical esters include those of aromatic monocarboxylic acids, such as 3,5-di-tert-butyl-4-hydroxybenzyl benzoate and 3,5-di-tert-amyl-4-hydroxybenzyl naphthenate; and esters of aromatic polycarboxylic acids, such as di(3,5-diisopropyl-4-hydroxybenzyl)-phthalate; di(3,5-di-tert-butyl-4-hydroxybenzyl)terephthalate; tri(3,5-di-tert-butyl-4-hydroxybenzyl)trimellitate; and tetra(3-methyl-5-tert-butyl-4-hydroxybenzyl)pyromellitate. Of these, the preferred class of esters is that of aromatic acids having up to two benzene nuclei and up to four carboxyl groups. Such esters may also have other substituents on the aromatic nuclei, including alkyl radicals, as in the esters of toluic acids; halide radicals, as in the esters of chlorobenzoic acids; nitro groups, as in the esters of 3,5-dinitrobenzoic acid; hydroxyl groups, as in the esters of salicylic acid; and formyl groups, as in the esters of phthalaldehydic acid.

Novel polyesters of aliphatic hydrocarbon polycarboxylic acids are also part of the invention. The aliphatic carboxylic acids may be either saturated or unsaturated acids. In the first category are included such esters as di(3,5-di-tert-butyl-4-hydroxybenzyl)oxalate; di(3-methyl-5-isopropyl-4-hydroxybenzyl)malonate; di(3,5-diisopropyl-4-hydroxybenzyl)succinate; di(3,5-di-tert-amyl-4-hydroxybenzyl)glutarate; and di(3,5-di-tert-octyl-4-hydroxybenzyl)sebacate. In the second category are such esters as di(3,5-di-tert-butyl-4-hydroxybenzyl)-maleate; di(3,5-diisopropyl-4-hydroxyl)mesaconate, and the like. Typical of diolefinic esters are the esters of such long-chain acids as 8,12-eicosadiene-1,20-dioic acid and 11-vinyl-8-octadecene-1,18-dioic acid.

Esters of polycarboxylic acids wherein less than all of the carboxyl groups are esterified are also useful products of the invention. These esters may be readily prepared by reacting the polycarboxylic acid with a hydroxybenzyl alcohol in a ratio of less than one equivalent of the alcohol per equivalent of acid. For example, mono(3,5-di-tert-butyl-4-hydroxybenzyl)phthalate is prepared by reacting together one mole of 3,5-di-tert-butyl-4-hydroxybenzyl alcohol for every mole of phthalic acid. In the same manner, mono(3-isopropyl-5-methyl-4-hydroxybenzyl)adipate may be easily obtained. Because these esters have at least one free carboxyl group, they may be further reacted with other compounds as, for example, polyols employed in the preparation of macromolecular polyesters, to afford materials wherein the antioxidant is polymerized in place.

The esters described may be prepared in a variety of ways. For example, they can be prepared by direct esterification of the organic carboxylic acid in liquid phase, preferably employing a slight excess of the reactant 3,5-dialkyl-hydroxybenzyl alcohol. Alternatively, the anhydride of the organic acid may be used, as in the case of acetic or phthalic anhydride. The acyl chloride of the organic acid may be employed by reaction in the presence of such a hydrogen chloride acceptor as pyridine. Such catalysts as the mineral acids including sulfuric acid or such sulfonic acids as p-toluenesulfonic acid may be employed with the acids if desired. Depending on the acidic reactant, the esterification has been observed to take place to high conversions and yields at temperatures from about 10° C. to about 150° C. Ester interchange may also be employed. The esterification may be carried out in such inert organic diluents as ethers, including diethyl ether, methyl ethyl ether, diisopropyl ether, tetrahydrofurane, dioxane, or the like; or in ketones, including acetone, ethyl amyl ketone, diisopropyl ketone, cyclohexanone or in chlorinated solvents. When the acyl halide reactant is employed, solvents used include such organic hydrochloric acid acceptors as pyridine.

The esters prepared in this manner are, in general, colorless or white crystalline solids at room temperature, miscible with most organic liquids and having sharp melting points. When employed in stabilizing amounts in organic materials subject to oxidative deterioration, the resulting compositions have enhanced resistance to this form of attack. Furthermore, the novel 3,5-dialkyl-4-hydroxybenzyl esters have several advantages over conventional antioxidants. In light-colored elastomeric substrates, such as in natural and synthetic rubber, the esters of the invention are non-discoloring and non-staining. Unlike many of the common rubber antioxidants, the esters do not discolor light-colored rubber objects in which they are incorporated. Furthermore, they do not migrate from the rubber product into adjacent substances such as lacquered or enamel surfaces in contact with the product. They are relatively non-toxic and are thus suitable for use with food-packaging materials or for incorporation into foodstuffs. Moreover, the hydroxybenzyl esters are relatively non-volatile and are therefore particularly useful in such applications as papermaking and plastic compounding where other antioxidants tend to volatilize and become lost during processing.

Esters of acids having other functional substituents than the carboxyl group may also be readily prepared, and such esters are characterized by both antioxidant and other properties such as sun-screening. For example, 3,5-di-tert-butyl-4-hydroxybenzyl salicylate is a useful ultraviolet absorbing ester of an hydroxylic aromatic acid, while 3,5-di-isopropyl-4-hydroxybenzyl chloroacetate represents an ester of a haloalkanoic acid having both antioxidant and germicidal properties.

Compositions of the invention comprise organic materials normally subject to oxidative deterioration which contain a small stabilizing amount of the 3,5-dialkyl-4-hydroxybenzyl alcohol ester described. By organic materials normally subject to oxidative deterioration are meant those substances containing carbon to carbon bonds and which, in the course of combining with atmospheric oxygen, suffer a degradation of their properties. These materials include hydrocarbon materials such as kerosene and gasoline, which upon prolonged storage tend to discolor and deposit undesirable gums and sludges. The hydroxybenzyl alcohol esters are also useful stabilizers for hydrocarbon oils heavier than gasoline, particularly oils whose viscosity, density and lubricating properties render them useful as engine lubricants. Small amounts of the hydroxybenzyl alcohol esters in paraffin or natural wax afford compositions which are stabler and more resistant to oxidative attack than the waxes alone.

Also included are hydrocarbon polyolefins, including the normally solid plastic polyolefins represented by polythene and polypropylene which, in the course of exposure to air and light, harden, discolor and become brittle. Other polymers subject to oxidative deterioration are the elastomers including natural rubber and such synthetic rubbers as GR–S, polybutadiene and polyisoprene which deteriorate by hardening, cracking and checking and by losing their resiliency and mechanical strength.

When natural or synthetic rubber containing the dialkylhydroxybenzyl alcohol esters described is processed, as by milling, curing or molding, the compositions are subjected to high temperatures which may volatilize some of the stabilizer in the rubber. However, the incorporation into the rubber of the stabilizer prior to processing renders the resulting rubber composition resistant to oxidative deterioration in the course of such processing. By incorporating the hydroxybenzyl alcohol esters into rubber compositions not exposed to high temperatures, such as rubber latices which are employed in paint or are coagulated by acid treatment, rubber-stabilizer compositions of enduring stability are achieved. Such stability is manifested by better retention of color, strength and elasticity and resistance to cracking, checking and tearing.

All of these materials may be stabilized against oxidation by incorporating therein during or after manufacture the described hydroxybenzyl alcohol esters. Addition of the crystalline alcohol ester to the liquid hydrocarbon fuels presents, of course, no problem, and the ester may be added in the form of a concentrate comprising a solution of the ester in a small amount of either the fuel itself or an inert mutual solvent. The hydroxybenzyl alcohol esters may be compounded with the resins or elastomers by addition to the materials at the latex stage, during processing on Banbury mills or with other substances added to the polymers in the course of manufacture.

Organic foodstuffs may also be stabilized against oxidation by placing them in intimate contact with the 3,5-dialkyl-4-hydroxybenzyl esters described. Representative foods include fruits, including oranges, pineapples, bananas, etc.; vegetables, such as eggplant, squash, avocados, etc.; dairy products, such as milk, dried milk powder, butter, chocolate, ice cream, cheese and the like; and poultry, including chickens, ducks, geese, and turkeys.

Particularly useful compositions are edible fats and oils of vegetable, animal or mineral origin and which upon storage for extended periods of time tend to develop rancid tastes and odors. Their useful life before rancidity is considerably extended by incorporation in these oils of such dialkyl-hydroxybenzyl alcohol esters as 3,5-di-tert-butyl-4-hydroxybenzyl acetate or 3-methyl-5-tert-butyl-1-4-hydroxybenzyl propionate. Typical oils include linseed oil, menhaden oil, cod liver oil, castor oil, olive oil, rapeseed oil, coconut oil, safflower oil, palm oil, corn oil, sesame oil, peanut oil, babassu oil, lard, beef tallow and the like. Also capable of stabilization in like manner are oils and fats which have been previously subjected to such treatments as air blowing, heat treatment and hydrogenation.

The esters may be physically incorporated with the foodstuffs or they may be employed at the surface of the foodstuffs as, for example, by impregnating the paper wrappers thereof with the antioxidant. In most organic materials packaged in solid form, such as butter, soap, bakery products and candy, oxidative attack occurs mostly at the surfaces of material. As a consequence, it is more important to provide the antioxidant at the surface than in the bulk of the packaged item. The most economical use of the 3,5-dialkyl-4-hydroxybenzyl ester in such uses is made by employing it only at the surface. This can be best effected by incorporating the antioxidant in paper, paperboard or other cellulosic sheet used in whole or in part for packaging the material.

It is well known that traces of chemicals present in paper products actually catalyze the oxidation of fatty organic materials in contact with the paper. Incorporation of stabilizing amounts of the 3,5-dialkyl-4-hydroxybenzyl ester described above in the paper serves both to suppress this oxidation catalysis and to preserve the material in contact wtih the board from normal oxidation resulting from prolonged exposure to air. The ester may be combined with the paper by conventional papermaking methods, for example, by applying it to the paper leaving the Fourdrinier machine by calendering onto the paper a solution of oil-in-water emulsion thereof.

The hydroxybenzyl ester may also be applied to such foods as meat and fish by spraying a dispersion thereof onto the surface of the material prior to storage or transportation of the foods. By using food compositions having the alcohol in intimate contact with their surface, the development of rancidity and discoloration is repressed for extended periods of time.

In addition to the preservation of foods, the 3,5-dialkyl-4-hydroxybenzyl esters are useful for suppressing oxidation in animal or poultry foods. For example, the hydroxybenzyl esters may be incorporated in silage and in poultry feed to prevent the development of rancidity and other undesirable off-tastes and odors. The additive may be incorporated in the feed in any suitable manner. When the feed is processed, i.e., cooked, pelleted, ground, etc., the hydroxybenzyl ester may be incorporated before processing in order to protect the vitamins A, D and E therein from degradation during handling, or it may be mixed therein after treatment. The ester may be used in such applications in the form of a dust, a spray, an emulsion, a solution or a solid.

Other organic substrates normally subject to oxidative deterioration which may be stabilized with the 3,5-dialkyl-4-hydroxy-benzyl esters are esters, particularly such higher fatty esters as those of the fatty acids, e.g., methyl linoleate, ethyl stearate, methyl palmitate, and the like, and aldehydes such as nonaldehyde, which, upon exposure to air, oxidize to the corresponding acid.

The amount of 3,5-dialkyl-4-hydroxybenzyl ester in the composition of the invention is that amount sufficient to stabilize the composition against oxidation. The requisite amount will, of course, depend on the efficacy of the particular hydroxybenzyl ester employed and the nature of the normally oxidizable material with which it is in intimate contact. It may be generally said that this amount will range from about 0.00001% by weight, based on the material, to about 5% by weight on the same basis. For example, suitable concentrations of the benzyl esters in distillate fuels, e.g., gasoline, kerosene, furnace oil, are on the order of 0.0007–0.0028% w. For such fuels, the preferred concentration range of these compounds will be from about 0.0001% w. to about 0.1% w., more especially to about 0.05% w. For some applications, where the composition is subjected to more drastic conditions, such as rubber, the composition may require up to 10% by weight, based on the oxidizable material, of the 3,5-dialkyl-4-hydroxybenzyl ester.

It will be understood that in addition to containing a stabilizing amount of the dialkyl-hydroxybenzyl ester the organic compositions of the invention may include such other ingredients as other antioxidants, pigments, fillers and the like. For example, in some preparations, it may be desirable to employ the dialkyl-hydroxybenzyl alcohol esters in combination with polynuclear phenolic inhibitors to obtain both low-temperature and high-temperature protection.

The following examples will serve to illustrate the nature of the invention. It should be understood, however, that the examples are merely illustrative and are not to be regarded as limitations on the appended claims, since the basic teachings therein may be varied at will as will be understood by one skilled in the art. In the examples, the ingredients are expressed in parts by weight unless otherwise indicated.

EXAMPLE I.—BIS(3,5-DI-TERT-BUTYL-4-HYDROXYBENZYL)ADIPATE

A solution of 35.4 g. (0.15 mole) of 3,5-di-tert-butyl-4-hydroxybenzyl alcohol in 15 ml. of pyridine was prepared, and to it was added 13.7 g. (0.075 mole) of adipyl chloride. The reaction mixture was allowed to stand for about 18 hours at room temperature with occasional warming. The resulting suspension was then diluted with benzene and washed with dilute aqueous hydrochloric acid.

The benzene layer containing the product ester was then separated, washed with water, extracted with dilute aqueous sodium bicarbonate to remove traces of acid, dried over anhydrous magnesium sulfate, and filtered to remove the drying agent. The benzene was evaporated and the residue treated with petroleum ether. Upon crystallization and recrystallization of the product from a benzene-petroleum ether solution, 38 g. (87% yield) of bis(3,5-di-tert-butyl-4-hydroxy-benzyl)adipate was obtained. The compound had a melting point of 110–112° C. and upon analysis gave the following data:

|  | C | H |
|---|---|---|
| Calculated for $C_{36}H_{54}O_6$ (M.W. 582.79) | 74.2 | 9.3 |
| Found | 74.5 | 9.3 |

EXAMPLE II.—3,5-DI-TERT-BUTYL-4-HYDROXYBENZYL BENZOATE

To a solution of 23.6 g. (0.1 mole) of 3,5-di-tert-butyl-4-hydroxybenzyl alcohol in 100 ml. of pyridine was added with stirring 14.5 g. (0.103 mole) of benzoyl chloride, while maintaining the reaction mixture in an ice bath. The mixture was allowed to stand at room temperature for about 12 hours, and was then poured into a mixture of ice and concentrated hydrochloric acid. The oil which separated from the slurry solidified and the resulting solid residue was collected, washed with water and crystallized from methanol to yield 25.5 g. of a crystalline product having a melting point of 80.5–82° C. (75% yield).

This solid was recrystallized from an acetone-petroleum ether mixture to yield a pure ester having a melting point of 81–82° C. and the following composition:

|  | C | H |
|---|---|---|
| Calculated for $C_{22}H_{28}O_3$ (M.W. 340.44) | 77.6 | 8.29 |
| Found | 77.8 | 8.3 |

EXAMPLE III.—3,5-DI-TERT-BUTYL-4-HYDROXYBENZYL PALMITATE AND STEARATE

To a solution of 22 g. (0.093 mole) of 3,5-di-tert-butyl-4-hydroxybenzyl alcohol in 100 ml. of pyridine was added with stirring 27 g. (0.1 mole) of palmitoyl chloride. The reaction mixture was allowed to stand at room temperature for five hours and was then poured into an ice-hydrochloric acid slurry and the product was collected. The resulting damp crystals were recrystallized from petroleum ether to yield 35 g. of product which was then recrystallized twice from methanol. About 26 g. of 3,5-di-tert-butyl-4-hydroxybenzyl palmitate was obtained (55% yield) having a melting point of 48–49° C. and the following composition:

|  | C | H |
|---|---|---|
| Calculated for $C_{31}H_{54}O_3$ (M.W. 474.7) | 78.42 | 11.47 |
| Found | 78.3 | 11.4 |

The stearate was prepared by reacting together at room temperature 28.4 g. (0.10 mole) stearic acid and 23.6 g. (0.10 mole) 3,5-di-tert-butyl-4-hydroxybenzyl alcohol in 200 ml. dioxane containing 2 ml. of concentrated sulfuric acid. The mixture was allowed to stand for about 12 hours, diluted with about 1000 ml. of water, and the resulting solid precipitate filtered off. The solid was dried on the filter and washed several times with water, affording about 50 g. of whitish waxy precipitate of 3,5-di-tert-butyl-4-hydroxyphenyl stearate.

EXAMPLE IV.—BIS(3,5-DI-TERT-BUTYL-4-HYDROXYBENZYL)PHTHALATE

A solution of 23.6 g. (0.1 mole) of 3,5-di-tert-butyl-4-hydroxybenzyl alcohol in 200 ml. of diethyl ether was prepared and to it was added 8 g. of pyridine and 10.1 g. (0.05 mole) of phthaloyl chloride. The reaction mixture was allowed to stand for about 12 hours, diluted with additional ether, and poured into an ice-hydrochloric acid slurry. The ether phase containing some crystals was isolated, washed with dilute aqueous hydrochloric acid and with water, dried over anhydrous magnesium sulfate, and filtered. The filtrate was then concentrated and the residue treated with petroleum ether. The ether solution was cooled to precipitate the phthalate ester which was collected and recrystallized twice from a chloroform-petroleum ether mixture.

A total of 20.5 g. of the bis(3,5-di-tert-butyl-4-hydroxybenzyl)phthalate was thus obtained. The phthalate had a melting point of 164.5–166° C. and the following composition:

|  | C | H |
|---|---|---|
| Calculated for $C_{38}H_{50}O_6$ (M.W. 602.78) | 75.7 | 8.36 |
| Found | 75.8 | 8.4 |

EXAMPLE V.—3,5-DI-TERT-BUTYL-4-HYDROXYBENZYL ACRYLATE

A mixture of 47.2 g. (0.2 mole) of 3,5-di-tert-butyl-4-hydroxybenzyl alcohol and 130 ml. acrylic acid was warmed gently on a steam bath until complete solution was achieved. To this was added about 10 ml. more of acrylic acid, containing about a drop of concentrated sulfuric acid.

The mixture was allowed to stand at room temperature for six hours and then poured into water. The organic phase was extracted with ether and the excess acrylic acid extracted from the organic phase with aqueous sodium bicarbonate. The ether phase was then dried over anhydrous magnesium sulfate, filtered and the filtrate concentrated on a steam bath. The residue was crystallized twice from petroleum ether to give a total of 19.9 g. of 3,5-di-tert-butyl-4-hydroxybenzyl acrylate. The ester had a melting point of 67.5–69° C. and the following composition:

|  | C | H |
|---|---|---|
| Calculated for $C_{18}H_{26}O_3$ (M.W. 290.4) | 74.44 | 9.03 |
| Found | 74.6 | 9.1 |

EXAMPLE VI.—3,5-DI-TERT-BUTYL-4-HYDROXYBENZYL ACETATE

To 100 ml. of glacial acetic acid containing 1 ml. of concentrated sulfuric acid was added 64.8 g. of 3,5-di-tert-butyl-4-hydroxyphenyl alcohol. The solid alcohol dissolved rapidly with the temperature of the mixture dropping rapidly from 25° C. to 20° C.

The resulting solution was filtered and allowed to stand for about an hour, at the end of which time the product had crystallized. The solid was stirred with ethylene glycol, the resulting slurry filtered and the solid washed with water several times. It was then dried under reduced pressure to yield 53.5 g. of faintly yellowish powder. A dried sample of this 3,5-di-tert-butyl-4-hydroxyphenyl acetate, recrystallized from isopentane at 0° C., was colorless and had a melting point of 104–106° C. Analysis showed the product to have the following composition:

| Percent | Oxygen | Ester Value, eq./100 g. | M.W. | Acidity, eq./100 g. | C | H |
|---|---|---|---|---|---|---|
| Calculated | 17.25 | 0.36 | 278 | 0.36 | 73.5 | 9.35 |
| Found | 17.1 | 0.33 | 276 | 0.34 | 73.5 | 9.4 |

EXAMPLE VII.—3,5-DI-TERT-BUTYL-4-HYDROXYBENZYL FORMATE

A mixture of 100 g. of glacial formic acid and 50 g. of 3,5-di-tert-butyl-4-hydroxybenzyl alcohol was stirred together at room temperature. The resulting solution quickly separated into two layers, one of which crystallized to a white solid on further stirring. This solid was separated, washed, and analyzed. Analysis showed it to be 3,5-di-tert-butyl-4-hydroxybenzyl formate, obtained in 98% yield.

EXAMPLE VIII

The esters prepared in the previous examples were evaluated as antioxidants in polypropylene. Polypropylene film samples each containing 0.5% by weight of an ester were tested by heat aging, outdoor exposure and Fadeometer. Resulting data are presented in Table I.

In the heat aging test, polypropylene film samples 5 mils in thickness were maintained in an oven at 133° C. Each sample was tested for loss of elongation three times a day until the film tore easily. The number of days shown on the table are the total elapsed days before the film tested lost its tensile strength and flexibility. It will be seen from the table that the esters increased the heat stability of the polypropylene by a factor of about 4.

In the outdoor exposure test, 5 mil film samples of polypropylene were exposed on the laboratory roof at Emeryville, California, and periodically tested by bending through 180°. The number of weeks required before the films so tested snapped on bending is shown in the table. It will be seen that the esters increased the weather stability of the polypropylene by a factor of from three to ten.

In the accelerated Fadeometer test, the conventional Atlas Weatherometer wherein the arc light source has been supplemented by addition of eight fluorescent ultraviolet light sources, all film samples tested pass within a quarter inch of the light sources. It has been found that in this accelerated exposure test, conditions are approximately eight times as stringent as in the unmodified Weatherometer. It will be seen from the table that under these extreme conditions use of the esters of the invention more than doubles the ultraviolet light stability of the polypropylene. This enhanced stability appears to be due, at least in part, to the strong absorption of ultraviolet radiation, in the 2800–2850 A. region, by the 3,5-dialkyl-hydroxybenzle esters of the invention.

Table I

| Ester | Heat Aging, Days | Outdoor Exposure, Weeks | Accelerated Fadeometer, Hours |
|---|---|---|---|
| None | <0.5 | ~0.5 | ~30 |
| 3,5,Di-tert-butyl-4-hydroxybenzyl benzoate | 2 | 5 | 70 |
| Di(3,5-di-tert-butyl-4-hydroxybenzyl) phthalate | 2 | 1.5 | 70 |
| 3,5-di-tert-butyl-4-hydroxybenzyl acrylate | 2 | 6 | 70 |
| Di(3,5-di-tert-butyl-4-hydroxybenzyl)adipate | 2 | 4 | 70 |

EXAMPLE IX

To 100 g. of styrene at room temperature is added with stirring one gram of 3,5-di-tert-butyl-4-hydroxybenzyl acrylate. The mixture is heated on a steam bath at 100° C. until polymerization is complete. The resulting casting is a hard water-white transparent copolymer which shows improved oxidation and light stability over pure polystyrene polymerized under the same conditions.

Similar results are obtained when a mixture of 80% styrene–20% methyl methacrylate containing 1% w., based on the mixture, is thermally polymerized to yield a styrene-methyl methacrylate-3,5-di-tert-butyl-4-hydroxybenzyl acrylate copolymer.

EXAMPLE X

When a series of soybean oil samples are prepared, each sample comprising 5 ml. of oil containing 0.1% w. of one of the following esters, and the samples are heated in air at 50° C., it is found that the samples containing the ester require considerably longer times to become rancid than does the sample containing no ester.

Esters employed in these tests are 3,5-diisopropyl-4-hydroxybenzyl acetate; 3-methyl-5-tert-butyl-4-hydroxybenzyl propionate; di(3,5-di-tert-butyl-4-hydroxybenzyl) sebacate; and 3,5-di-tert-amyl-2-hydroxyphenyl acetate.

EXAMPLE XI

When 0.25-pound blocks of butter are stored at room temperature in bleached sulfite pulp handsheets containing 0.25% w. 3-methyl-5-isopropyl-4-hydroxybenzyl benzoate, the odor of rancidity from the resulting package requires at least twice as long to become apparent as that from blocks stored at identical temperature in samples of the same paper containing no antioxidant.

EXAMPLE XII

When a sample of freshly cut alfalfa is sprayed with a 5% aqueous dispersion of 3,5-diisopropyl-4-hydroxybenzyl propionate and then sun-dried and chopped, it is found that there is far less degradation of the vitamin content in treated samples and somewhat less degradation than in samples treated with a dispersion of comparable concentration of 2,6-di-tert-butyl-4-methylphenol.

EXAMPLE XIII

Weighed samples of alpha-cellulose pulp taken from the same sheet are each impregnated with a different stabilizer by dipping each sample into an alcoholic solution of the stabilizer, blotting the sample, and air-drying it at room temperature. The dry samples are then weighed to determine the amount of antioxidant incorporated in them.

When dry, the samples are cut to 2″ x 3″ squares and a weighed amount of antioxidant-free lard is applied to both surfaces of the paper. The lard is spread in a thin film, completely covering the surface. Each sample is then placed in a one-quart bottle sealed with a screw cap and incubated at 110° F. The samples are removed daily from the oven and sniffed and rated by a three-man panel.

Under these conditions, the lard-paper samples containing 3,5-di-tert-butyl-4-hydroxybenzyl acetate are approximately seven times as stable at stabilizer concentrations of 0.5% w., based on the paper, than lard-paper samples containing butylated hydroxyanisole, about four times as stable as samples containing equivalent amounts of a butylated hydroxyanisole-propyl gallate-citric acid mixture, and about twice as stable as a mixture of equal parts of butylated hydroxyanisole and 2,6-di-tert-butylphenol.

EXAMPLE XIV

A slab of bacon is stabilized against rancidity by soaking it in a 10% vegetable oil solution of 3-tert-butyl-5-methyl-4-hydroxybenzyl benzoate until a stabilizing amount of the inhibitor has been incorporated in the bacon.

EXAMPLE XV

To a sample of a conventional aircraft engine oil having the following properties:

| | |
|---|---|
| Saybolt Universal viscosity at 210° F., sec. | 96.7 |
| Viscosity index | 109 |
| Pour point, undiluted, ° F. | −10 |
| Pour point, diluted, ° F. | −75 |
| Carbon residue, Conradson, percent w. | 0.27 |
| Flash point, open, ° F. | 510 | was added as a stabilizer 0.1% w. of 3,5-di-tert-butyl-4-hydroxybenzyl laurate.

We claim as our invention:

1. The 3,5-dialkyl-4-hydroxybenzyl ester wherein each ester moiety is that of 3,5-dialkyl-4-hydroxybenzyl alcohol, each of said alkyl radicals having up to 8 carbon atoms and at least one of said alkyl radicals being branched on the alpha carbon atom, and the acid moiety is that of an organic carboxylic acid selected from the group consisting of alkenoic acids, aliphatic dicarboxylic acids, and aromatic acids having up to two rings.

2. The ester of claim 1 wherein the acid is an alkenoic acid.

3. The ester of claim 1 wherein the acid is an aliphatic dicarboxylic acid.

4. The ester of claim 1 wherein the acid is an aromatic acid having up to two rings.

5. 3,5-di-tert-butyl-4-hydroxybenzyl acrylate.
6. Bis(3,5-di-tert-butyl-4-hydroxybenzyl)adipate.
7. Bis(3,5-di-tert-butyl-4-hydroxybenzyl)phthalate.
8. 3,5-di-tert-butyl-4-hydroxybenzyl benzoate.

References Cited in the file of this patent

UNITED STATES PATENTS

| | | |
|---|---|---|
| 1,553,271 | Schonle et al. | Sept. 8, 1925 |
| 2,291,522 | Backoff et al. | July 28, 1942 |
| 2,357,547 | Proell | Sept. 5, 1944 |
| 2,439,204 | Emerson et al. | Apr. 6, 1948 |
| 2,591,604 | Reck | Apr. 1, 1952 |
| 2,607,745 | Magoffin | Aug. 19, 1952 |
| 2,607,746 | Magoffin | Aug. 19, 1952 |

OTHER REFERENCES

Chemical Abstracts, vol. 48, 1987e (1954).